(12) United States Patent
Ledesma

(10) Patent No.: US 6,208,240 B1
(45) Date of Patent: Mar. 27, 2001

(54) MISALIGNMENT SENSOR

(75) Inventor: Ragnar H. Ledesma, Sterling Heights, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/456,180

(22) Filed: Dec. 7, 1999

(51) Int. Cl.$^7$ ...................................................... B60Q 1/00
(52) U.S. Cl. .......................... 340/438; 340/439; 340/440; 340/686.2; 73/457
(58) Field of Search ..................................... 340/438, 439, 340/440, 686.2, 686.3; 33/203.18, 203.13; 356/155; 73/457

(56) References Cited

U.S. PATENT DOCUMENTS

| | | | |
|---|---|---|---|
| 3,597,728 | * 8/1971 | Kurtz | 340/52 |
| 3,897,636 | * 8/1975 | Leblanc | 33/203.13 |
| 4,458,535 | * 7/1984 | Juergens | 73/651 |
| 4,907,452 | * 3/1990 | Yopp | 73/457 |
| 5,269,186 | * 12/1993 | Yopp | 73/457 |
| 5,786,751 | * 7/1998 | Robby | 340/438 |
| 5,795,997 | * 8/1998 | Gittins et al. | 73/118.1 |
| 5,875,418 | * 2/1999 | Gill et al. | 702/150 |

* cited by examiner

*Primary Examiner*—Daniel J. Wu
*Assistant Examiner*—Phung Nguyen
(74) *Attorney, Agent, or Firm*—Carlson, Gaskey & Olds

(57) ABSTRACT

In a disclosed embodiment, a steering axle wheel assembly for a vehicle is provided with a system for actively sensing and alerting a vehicle user of wheel misalignment. The wheel assembly includes an elongated tie rod extending between two wheels and a rotatable knuckle system connecting each wheel to a respective end of the tie rod. A steer angle, that is, the angle of a wheel with respect to an axle, is monitored. When the steer angle is significant, result in a tensile or compressive force is provided on the tie rod. This force on the tie rod is small when the steer angle is small. The tie rod is provided with a system to measure the force. An alerting system is provided which alerts a vehicle user when significant tensile or compressive force on the tie rod is measured, and the steer angle is small. Thus, a vehicle user is actively alerted of wheel misalignment.

7 Claims, 1 Drawing Sheet

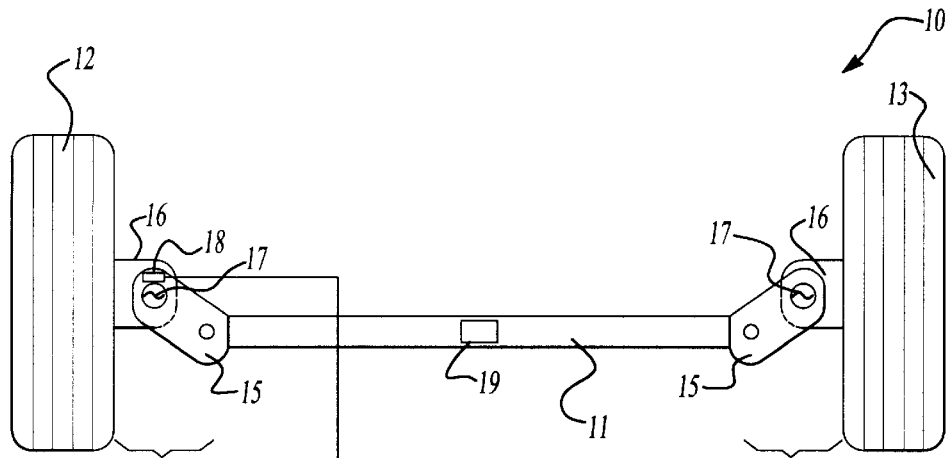
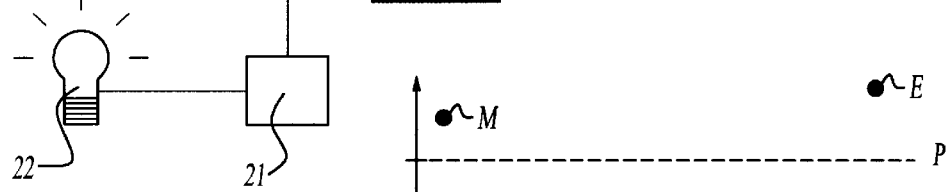
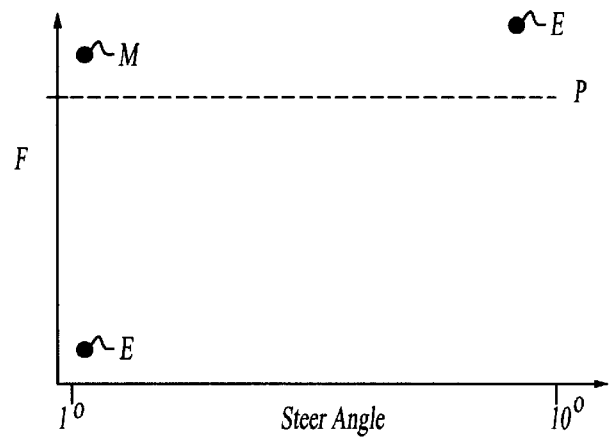
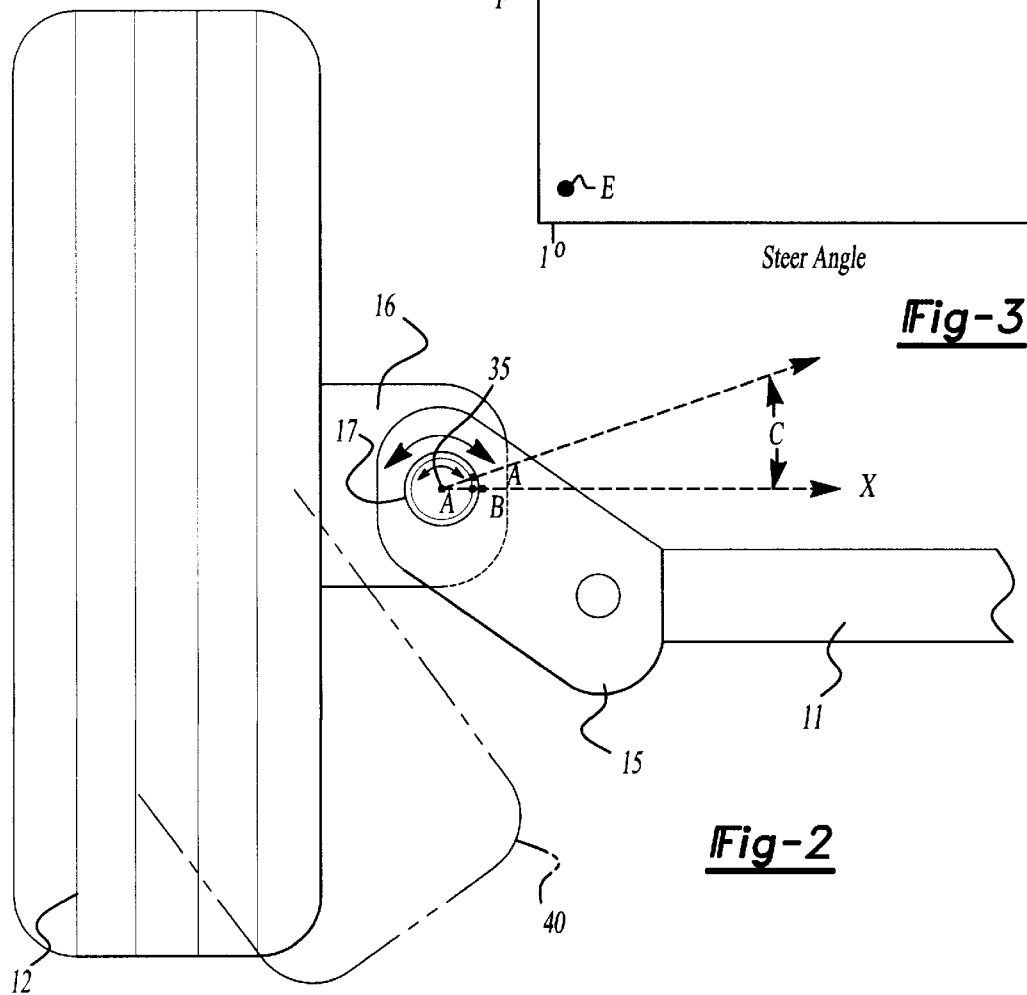

MISALIGNMENT SENSOR

BACKGROUND OF THE INVENTION

This invention relates to a system for sensing wheel misalignment while a vehicle is moving. Wheel misalignment is a common problem in modern vehicles. Many driving conditions can result in wheel misalignment. Until it is detected, wheel misalignment can adversely affect a vehicle's steering system as well as provide uneven tire wear. The longer that significant wheel misalignment goes undetected and uncorrected, the greater the undesirable tire wear.

Typically wheel misalignment is detected at a time when a vehicle is serviced. Of course, this only occurs periodically. It would be desirable to provide a system whereupon a user of a vehicle may actively determine wheel misalignment.

SUMMARY OF THE INVENTION

In the disclosed embodiment of this invention a steering axle wheel assembly for a vehicle is provided with a system for actively sensing wheel misalignment. The steering axle wheel assembly is a basic system known to one of ordinary skill in the art and includes an elongated tie rod extending between two wheels and a rotatable knuckle system connecting each wheel to a respective end of the tie rod.

A steer angle measured from the front wheel with respect to a front axle changes as the vehicle is turned When the vehicle is being turned, and the steer angle is significant, there is a tensile or compressive force on the tie rod. With a small steer angle this force should be quite small. However, if the wheels are misaligned, the force will be large. By monitoring the force on the tie rod when the steer angle is small, one can actively predict misalignment.

The steer angle can be monitored by the relationship of elements in the rotatable knuckle system that connects each wheel to a respective end of the tie rod. The rotatable knuckle rotates on a kingpin defining an axis. The steer angle is characterized by the angle of rotation of the knuckle about the kingpin axis. This measurement is zero when the wheels are in the straight ahead position. The inventive system monitors this angle.

The tie rod is provided with a sensor to measure force. The force should be zero with the wheels in the straight ahead position. The present invention monitors the steer angle and the force. If a predetermined force is exceeded when the steer angle is below a minimum, a decision is made that the wheels are misaligned.

An alerting system is provided which alerts a vehicle user when misalignment is indicated. To reduce any effect of anomalies or noise on the force measurement, a moving average may be employed.

These and other features of the present invention can be best understood from the following specification and drawings, the following of which is a brief description.

BRIEF DESCRIPTION OF THE DRAWINGS

FIG. 1 is a schematic view of a front wheel system incorporating the misalignment sensing system of the present invention.

FIG. 2 is a schematic view of the characterization of the steer angle that is measured by the misalignment sensing system of the present invention.

FIG. 3 graphically shows the invention.

DETAILED DESCRIPTION OF A PREFERRED EMBODIMENT

FIG. 1 schematically shows a steering axle wheel assembly 10 which includes an elongated tie rod 11 extending between two wheels 12, 13 and a rotatable knuckle system 14 connecting each wheel 12, 13 to a respective end of tie rod 11. Knuckle system 14 includes a first element 16 connected to each wheel 12, 13 and a second knuckle element 15 connected to the tie rod 11. Knuckle system 14 further includes kingpin 17. Kingpin 17 has an axis about which first element 16 and second knuckle element 15 may rotate. As known, the tie rod is connected to a steering system which transmits steering force through the tie rod 11 to turn the wheels 12, 13 in unison to steer a vehicle.

FIG. 2 schematically shows a detail of the elements of the knuckle system that define the steer angle. Wheel 12 is connected to first element 16. Second knuckle element 15 connects to a tie rod 11. Kingpin 17 defines an axis 35 upon which first element 16 and second knuckle element 15 rotate. It should be understood that there is a corresponding wheel and knuckle system at the other end of tie rod 11.

The angle of rotation, or the steer angle, may be measured in relation to an x-axis. Point A is a point along the outer circumference of kingpin 17. Point B is a point along the inner circumference of first and second elements 16, 15. When wheel 12 is in a straight ahead position, point A and point B lie along the same x-axis. As wheel 12 turns, first and second elements 16, 15 rotate about kingpin axis 35. As an example, the wheel is shown in phantom at 40 after having turned. As a result, points A and B no longer rest along a same axis. In this position, a steer angle C is defined.

Back to FIG. 1, knuckle system 14 is provided with a sensor 18 which senses and measures a steer angle. Any of several known sensors can provide this measurement. A potentiometer or RVDT may be used. Tie rod 11 is provided with a force measuring device 19 which measures tensile or compressive force. To reduce the effect of road anomalies and noise on the measurement of tensile or compressive force, a moving average may be employed. Force measuring device 19 and sensor 18 communicate with a control 21.

The control 21 may only activate device 19 when the measured steer angle is small. As an example, the device 19 may only be actuated when the steer angle is between 1 and negative one degree. The control is programmed with a predetermined force level at the small angle which is indicative of tire misalignment. An appropriate predetermined level can be found experimentally.

The reason the method of this invention works is shown graphically in FIG. 3. As shown at steer angles below one degree, the force F on the tie rod which is expected is shown at E, and is below a predetermined force value P. The expected force is not always low. As an example, the expected force E at a steer angle of say 10 degrees may be above P. However, in the preferred embodiment, the control does not monitor the force when the steer angle is small.

However, if the steer angle is low, and the monitored force M on the tie rod exceeds the predetermined value P, then a decision is made that the wheels are misaligned. Control 21 activates an alerting system 22 to alert a vehicle user of misalignment.

With respect to FIG. 1, the inventive system for sensing wheel misalignment operates as follows: During vehicle operation a first sensing device 18 senses and measures a steer angle. When the steer angle is small, a force measuring device 19 measures tensile or compressive force along a tie rod 11. If a significant force is detected when the steer angle is very small, misalignment is indicated. Thus, a vehicle user is actively alerted of wheel misalignment.

For purposes of FIG. 3 and the claims both the force and the steer angle are compared to positive limits. For the drawings and claims it is the magnitude of the force and the angle which is being compared. Of course, both the force and the angle can be positive or negative.

Preferred embodiments of this invention have been disclosed. However, a worker of ordinary skill in this art would recognize that certain modifications would come within the scope of this invention. For that reason, the following claims should be studied to determine the true scope and content of this invention.

What is claimed is:

1. A steering axle wheel assembly for a vehicle comprising:
   a connecting system for connecting two wheels;
   said connecting system including an elongated tie rod extending between two wheels;
   a rotatable knuckle system connecting each wheel to a respective end of said tie rod;
   said rotatable knuckle system including a kingpin defining an axis, and a knuckle which may rotate about said axis; and
   said connecting system being equipped with a system for sensing wheel misalignment including a sensing device in the rotatable knuckle system which reflects an angle of rotation of said knuckle about said kingpin axis.

2. An assembly for a vehicle as set forth in claim 1, wherein said tie rod is equipped with a sensor to measure tensile or compressive force.

3. An assembly for a vehicle as set forth in claim 2, wherein said tie rod sensor is only actuated when said sensing device in the rotatable knuckle system determines the magnitude of said angle of rotation is below a limit.

4. An assembly for a vehicle as set forth in claim 2, wherein said sensor to measure tensile or compressive force is connected to an alerting system to alert a vehicle user of wheel misalignment.

5. A steering axle wheel assembly for a vehicle comprising:
   a connecting system for connecting two wheels,
   said connecting system including an elongated tie rod extending between two wheels;
   a rotatable knuckle system connecting each wheel to a respective end of said tie rod;
   said rotatable knuckle system including a kingpin defining an axis, and a knuckle which may rotate about said axis,
   a system for sensing wheel misalignment including a sensing device in the rotatable knuckle system which measures an angle of rotation of said knuckle about said kingpin axis;
   said tie rod being equipped with a system to measure tensile or compressive force in response to said sensing device in the rotatable knuckle system and a control for determining if the magnitude of said measured force exceeds a predetermined amount when the magnitude of said measured angle is below a limit, and then indicating wheel misalignment.

6. An assembly for a vehicle as recited in claim 5, wherein said tie rod system is only actuated when said sensing device determines the magnitude of an angle of rotation is below a limit.

7. A method for actively sensing wheel misalignment of a vehicle comprising the steps:
   sensing and measuring the magnitude of an angle of rotation of a rotatable knuckle system about a kingpin,
   measuring a force on a tie rod and activating an alerting system which alerts a vehicle user of wheel misalignment if the magnitude of said force is above a limit when said magnitude of the measured angle of rotation is below a limit.

\* \* \* \* \*